(12) United States Patent
Nguyen et al.

(10) Patent No.: US 6,412,021 B1
(45) Date of Patent: Jun. 25, 2002

(54) METHOD AND APPARATUS FOR PERFORMING USER NOTIFICATION

(75) Inventors: Phuong T. Nguyen, Foster City; Linda Schneider, Campbell; Joseph F. Di Pol, Sunnyvale, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/031,399

(22) Filed: Feb. 26, 1998

(51) Int. Cl.$^7$ .............................. G06F 11/32; G06F 9/54
(52) U.S. Cl. ..................... 709/318; 345/977; 709/217
(58) Field of Search .................. 709/300, 303, 709/315, 217, 316, 318, 310, 219, 105; 345/967, 977; 340/601

(56) References Cited

U.S. PATENT DOCUMENTS

| | | | |
|---|---|---|---|
| 5,291,585 A | 3/1994 | Sato et al. | |
| 5,335,320 A | 8/1994 | Iwata et al. | |
| 5,345,550 A | 9/1994 | Bloomfield | |
| 5,347,627 A | 9/1994 | Hoffmann et al. | |
| 5,384,911 A | 1/1995 | Bloomfield | |
| 5,412,772 A | 5/1995 | Monson | |
| 5,414,806 A | 5/1995 | Richards | |
| 5,423,034 A | 6/1995 | Cohen-Levy et al. | |
| 5,430,836 A | 7/1995 | Wolf et al. | |
| 5,436,637 A | 7/1995 | Gayraud et al. | |
| 5,448,695 A | 9/1995 | Douglas et al. | |
| 5,461,399 A | 10/1995 | Cragun | |
| 5,461,710 A | 10/1995 | Bloomfiled et al. | |
| 5,473,745 A | 12/1995 | Berry et al. | |
| 5,491,784 A | 2/1996 | Douglas et al. | |
| 5,493,638 A | 2/1996 | Hooper et al. | |
| 5,509,116 A | 4/1996 | Hiraga et al. | |
| 5,526,517 A | 6/1996 | Jones et al. | |
| 5,544,288 A | 8/1996 | Morgan et al. | |
| 5,546,519 A | 8/1996 | Berry | |
| 5,548,702 A | 8/1996 | Li et al. | |
| 5,550,968 A | 8/1996 | Miller et al. | |
| 5,559,942 A | 9/1996 | Gough et al. | |
| 5,564,003 A | 10/1996 | Bell et al. | |
| 5,566,330 A | 10/1996 | Sheffield | |
| 5,570,462 A | 10/1996 | McFarland | |
| 5,572,643 A | 11/1996 | Judson | |
| 5,694,603 A | 12/1997 | Reiffin | |
| 5,694,604 A | 12/1997 | Reiffin | |
| 5,918,237 A | * 6/1999 | Montalbano | ................ 707/513 |

OTHER PUBLICATIONS (NCSA) National Center for Supercomputing Applications. "The Savina Web Browser", pp. 1–11, 1997.*

(List continued on next page.)

Primary Examiner—St. John Courtenay, III
Assistant Examiner—Lewis A. Bullock, Jr.
(74) Attorney, Agent, or Firm—The Hecker Law Group

(57) ABSTRACT

A method and apparatus for performing user notification. In a desktop environment in which multiple applications, or applets may be simultaneously resident in main memory, it may be necessary to release or unload one or more applications or applets from main memory to provide memory space for a newly selected application or applet. Applications or applets thus unloaded are incapable of providing feedback or user notification of state changes associated with the respective application or applet. An embodiment of the invention provides a user notification class for notifying users of application or applet state changes. For each application or applet that needs to provide user notification, the desktop manager loads an instance of a notification class as an independent thread which will operate even when the associated application or applet is not resident in main memory. The user notification class instance performs all notification functions on behalf of the application or applet. An event mechanism is provided for an application or applet to communicate with its associated user notification thread.

21 Claims, 10 Drawing Sheets

OTHER PUBLICATIONS

IBM. "Electronic Climactic Scheduler Mechanism". Jan. 01, 1994.*

Perry, Larry F. "WeatherXpress". 1998.*

Ronald L. Johnston, "The Dynamic Incremental Compiler of APL/3000" Proceedings of the API '79 Conference, published as APL Quote Quad, 9(4), p 82–87.

Leo J. Guibas et al., "Compilation and Delayed Evaluation in APL," Fifth Annual Synposium on Principles in Programming Languages, p 1–8, 1978.

Gleen Krasner "The Smalltalk–80 Virtual Machine" BYTE Publications Inc., Aug. 1991, pp 300–320.

\* cited by examiner

METHOD AND APPARATUS FOR PERFORMING USER NOTIFICATION

BACKGROUND OF THE INVENTION

1. Field of the Invention

This invention relates to the field of computer software, and, more specifically, to object-oriented computer applications.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Solaris, "Write Once, Run Anywhere", Java, JavaOS, JavaStation, HotJava Views and all Java-based trademarks and logos are trademarks or registered trademarks of Sun Microsystems, Inc. in the United States and other countries.

2. Background Art

The Java™ programming language, developed by Sun Microsystems™, Inc., has an advantage over other programming languages of being a "write once, run anywhere"™ language. The Java™ programming language provides a substantially platform-independent mechanism for applications to be designed, distributed and executed in the form of bytecode class files. The Java™ virtual machine within the Java™ runtime environment handles the resolution of the bytecodes into the requisite platform dependent instruction set, so that all computing platforms which contain a Java™ runtime environment are capable of executing the same bytecode class files.

Java™-based systems, such as HotJava View™, are being developed that allow enterprises to load applications, in the form of applets, from a centralized server. Each client on the network accesses and executes the same applications, regardless of computing platform, and the source files remain in a centralized and controlled location. As a result, application management requirements are minimized. This client-server arrangement also permits the use of network computers, i.e., "thin client" computers with minimized I/O and storage facilities.

However, the application memory available to the Java™ runtime environment is limited, particularly in systems which do not implement virtual memory. As a result, the number of applets that can be simultaneously supported in the runtime environment is also limited. Applets may need to be unloaded from the runtime environment to make room in memory for the newly selected applet. The unloading of applets presents a problem for applets which need to run continuously to provide feedback to a user about a change of state in the applet. For example, an electronic mail applet may wish to notify a user when new mail arrives, or a calendar applet may wish to notify a user of an impending appointment. Once applet classes are unloaded from the runtime environment, there is no mechanism by which the unloaded applet may provide feedback to the user. This problem can be better understood from a review of object-oriented programming and the Java™ development and runtime environment.

Object-Oriented Programming

Object-oriented programming is a method of creating computer programs by combining certain fundamental building blocks, and creating relationships among and between the building blocks. The building blocks in object-oriented programming systems are called "objects." An object is a programming unit that groups together a data structure (one or more instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction sent to the object to execute a certain method. A message consists of a method selection (e.g., method name) and a plurality of arguments. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214–223.

A class defines a type of object that typically includes both variables and methods for the class. An object class is used to create a particular instance of an object. An instance of an object class includes the variables and methods defined for the class. Multiple instances of the same class can be created from an object class. Each instance that is created from the object class is said to be of the same type or class.

To illustrate, an employee object class can include "name" and "salary" instance variables and a "set_salary" method. Instances of the employee object class can be created, or instantiated for each employee in an organization. Each object instance is said to be of type "employee." Each employee object instance includes "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

A hierarchy of classes can be defined such that an object class definition has one or more subclasses. A subclass inherits its parent's (and grandparent's etc.) definition. Each subclass in the hierarchy may add to or modify the behavior specified by its parent class. Some object-oriented programming languages support multiple inheritance where a subclass may inherit a class definition from more than one parent class. Other programming languages support only single inheritance, where a subclass is limited to inheriting the class definition of only one parent class. The Java™ programming language also provides a mechanism known as an "interface" which comprises a set of constant and abstract method declarations. An object class can implement the abstract methods defined in an interface. Both single and multiple inheritance are available to an interface. That is, an interface can inherit an interface definition from more than one parent interface.

An object is a generic term that is used in the object-oriented programming environment to refer to a module that contains related code and variables. A software application can be written using an object-oriented programming language whereby the program's functionality is implemented using objects.

Java™ Programming and Execution

The Java™ programming language is an object-oriented programming language with each program comprising one or more object classes and interfaces. Unlike many programming languages, in which a program is compiled into machine-dependent, executable program code, Java™ classes are compiled into machine independent bytecode class files. Each class contains code and data in a platform-independent format called the class file format. The computer system acting as the execution vehicle supports the Java™ runtime environment. The runtime environment contains a program called a virtual machine, which is responsible for executing the code in Java™ classes.

Applications may be designed as standalone Java™ applications, or as Java™ "applets" which are identified by an applet tag in an HTML (hypertext markup language) document, and loaded by a browser application. The class files associated with an application or applet may be stored on the local computing system, or on a server accessible over a network. Each class is loaded into the runtime environment, as needed, by the "class loader."

The classes of an applet are loaded on demand from the network (stored on a server), or from a local file system, when first referenced during the applet's execution. The runtime environment locates and loads each class file, parses the class file format, allocates memory for the class's various components, and links the class with other already loaded classes. This process makes the code in the class readily executable by the virtual machine.

FIG. 2 illustrates the compile and runtime environments for a Java™ system. In the compile environment, a software developer creates source files 200, which contain the programmer readable class definitions, including data structures, method implementations and references to other classes. Source files 200 are provided to compiler 201, which compiles source files 200 into compiled ".class" files 202 that contain bytecodes executable in a Java™ runtime environment. Bytecode class files 202 are stored (e.g., in temporary or permanent storage) on a server, and are available for download over a network. Alternatively, bytecode class files 202 may be stored locally in a directory on the client platform.

The Java™ runtime environment contains a virtual machine 205 which is able to execute bytecode class files and execute native operating system ("O/S") calls to operating system 209 when necessary during execution. Virtual machine 205 provides a level of abstraction between the machine independence of the bytecode classes and the machine-dependent instruction set of the underlying computer hardware 210. Class loader and bytecode verifier ("class loader") 203 is responsible for loading bytecode class files 202 and supporting Java™ class libraries 204 into virtual machine 205 as needed. Either an interpreter 206 executes the bytecodes directly, or a "just-in-time" (JIT) compiler 207 transforms the bytecodes into machine code, so that they can be executed by the processor in hardware 210. Class loader 203 also verifies the bytecodes of each class file to maintain proper execution and enforcement of Java™ security rules.

Java™ class files are often identified in applet tags within an HTML (hypertext markup language) document. To provide a client with access to class files from a server on a network, a web server application is executed on the server to respond to HTTP (hypertext transport protocol) requests containing URLs (universal resource locators) to HTML documents, also referred to as "web pages." When a browser application executing on a client platform receives an HTML document (e.g., as a result of requesting an HTML document by forwarding a URL to the web server), the browser application parses the HTML and automatically initiates the download of the bytecode class files 202 when it encounters the applet tag in the HTML document.

Memory is allocated to store and execute the downloaded applet. The allocation of memory to new applets may lead to a low memory condition as the number of applets in the Java™ runtime environment grows. To resolve the low memory condition, older, invisible applets (i.e., applets that are not currently visible on a display) may be unloaded, or "destroyed" (i.e., shutdown and de-allocated), to release memory. An applet thus destroyed can no longer enact user notification functions when events occur that are relevant to the destroyed applet.

SUMMARY OF THE INVENTION

A method and apparatus for performing user notification is described. In a desktop environment in which multiple applications or applets may be simultaneously resident in main memory, it may be necessary to release or unload one or more applications or applets from main memory to provide memory space for a newly selected application or applet. Applications or applets thus unloaded are incapable of providing feedback or user notification of state changes associated with the respective application or applet. An embodiment of the invention provides a user notification class for notifying users of application or applet state changes. For each application or applet that needs to provide user notification, a desktop manager loads an instance of a notification class as a thread which will operate even when the associated application or applet is not resident in main memory. The user notification class instance performs all notification functions on behalf of the application or applet. An event mechanism is provided for an application or applet to communicate with its user notification thread. Also, an application or applet may access the methods of its associated user notification class.

In one embodiment of the invention, the desktop manager is an application running in a Java™ runtime environment, with other applications embodied as applets which may be selected via button icons in a selection bar. Upon startup, the desktop manager accesses a configuration file specifying the button icons to be displayed in the selection bar. The configuration file also contains information associated with each button icon, including the URL of an HTML document containing the desired applet to be invoked upon selection of the button icon, several default images for the button icon, and the location of the code for the notification class to associate with the button icon and its applet. The desktop manager displays each button icon in the selection bar, and loads the respective notification classes based on the information in the configuration file.

An instance of a user notification class performs user notification functions on behalf of the applet, for example, by changing the image or images associated with the button icon, by displaying a message in a dialog box, by playing an audio clip, or by performing some combination of notification mechanisms. An applet communicates with its associated notification class instance by obtaining a reference to the notification class instance from the desktop manager, and either placing an event onto the event queue of the notification class instance or accessing the methods of the notification class instance directly. In this way, an applet can be restricted to communicate only with its associated notification class. For applet events, the notification class instance interprets the type of event from the event ID and handles the event as appropriate.

DETAILED DESCRIPTION OF THE INVENTION

The invention is a method and apparatus for performing user notification. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Though described with reference to desktop environments, the Java™ programming language and the Java™ runtime environment, embodiments of the invention may be similarly applied to other multi-threaded environments in which memory resources are constrained, such as personal digital assistants (PDA's), or where specific services are curtailed by the unloading of application program elements from memory. For example, a large application or manager mechanism with many sub-components or sub-applications may implement an embodiment of the invention to simultaneously run a limited number of sub-components while maintaining, in independent threads, specific services of those sub-components that are currently not running. Also, embodiments of the invention may be directed to providing specific services other than, or in addition to, user notification, such as monitoring and simple resource management tasks.

Embodiment of Computer Execution Environment (Hardware)

Figure 1:
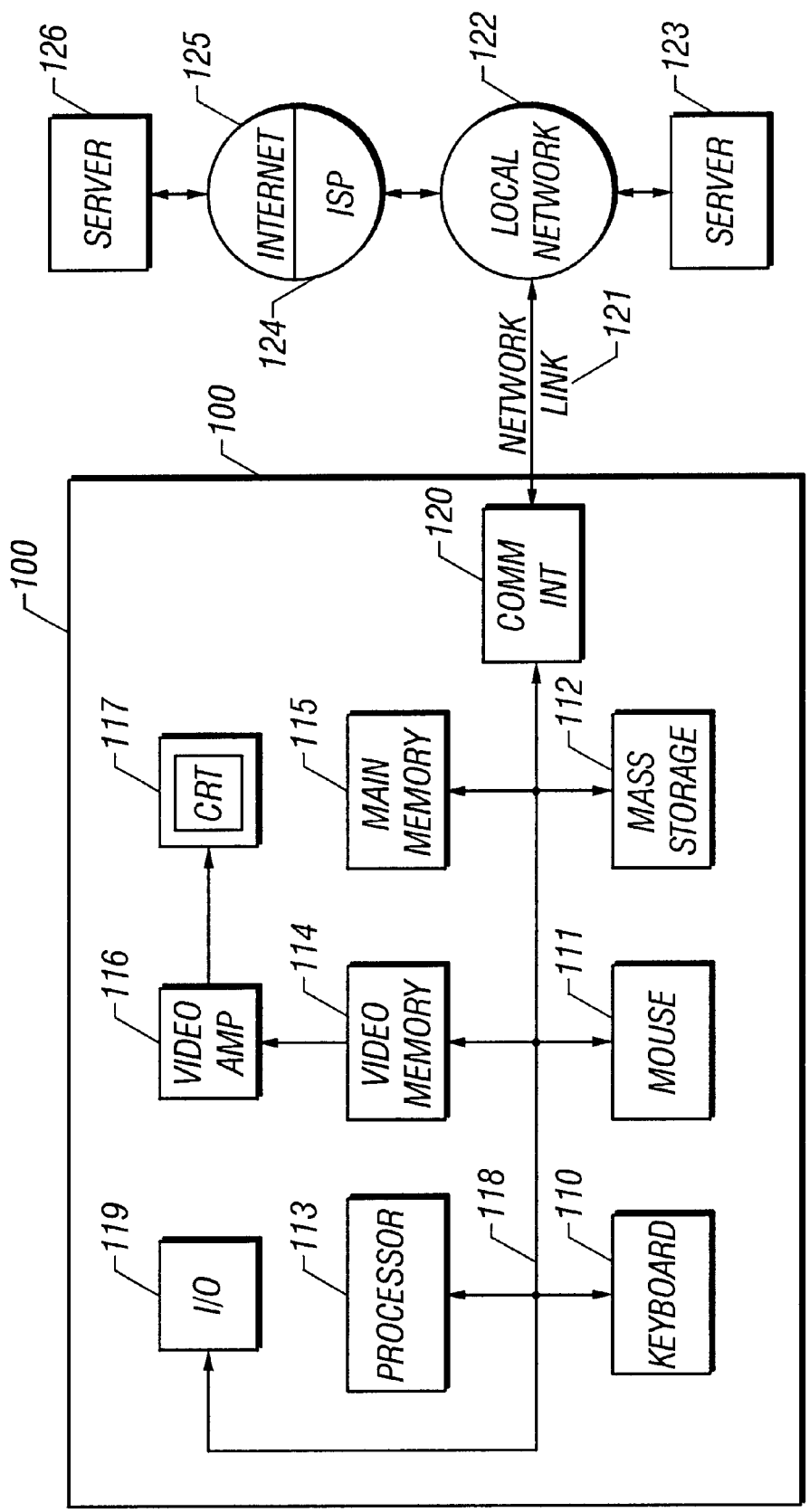
FIG. 1 is a block diagram of one embodiment of a computer system capable of providing a suitable execution environment for an embodiment of the invention.
Figure 2:
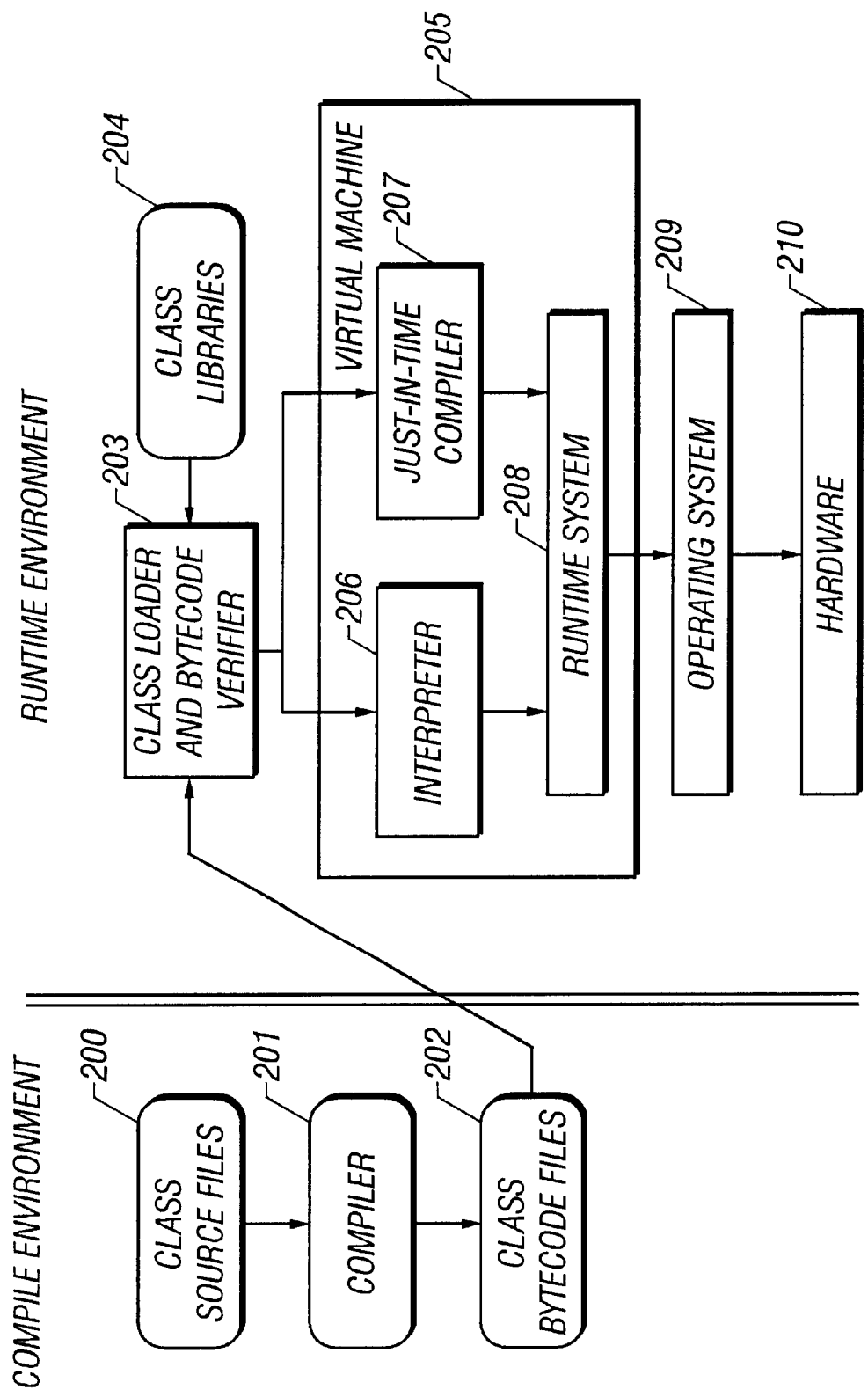
FIG. 2 is a block diagram of a Java™ development and runtime environment.

An embodiment of the invention can be implemented as computer software in the form of computer readable code executed on a general purpose computer such as computer 100 illustrated in FIG. 1, or in the form of bytecode class files executable within a Java™ runtime environment running on such a computer. A keyboard 110 and mouse 111 are coupled to a bi-directional system bus 118. The keyboard and mouse are for introducing user input to the computer system and communicating that user input to processor 113. Other suitable input devices may be used in addition to, or in place of, the mouse 111 and keyboard 110. I/O (input/output) unit 119 coupled to bi-directional system bus 118 represents such I/O elements as a printer, A/V (audio/video) I/O, etc.

Computer 100 includes a video memory 114, main memory 115 and mass storage 112, all coupled to bi-directional system bus 118 along with keyboard 110, mouse 111 and processor 113. The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 32-bit data bus for transferring data between and among the components, such as processor 113, main memory 115, video memory 114 and mass storage 112. Alternatively, multiplex data/address lines may be used instead of separate data and address lines.

In one embodiment of the invention, the processor 113 is a microprocessor manufactured by Motorola, such as the 680X0 processor or a microprocessor manufactured by Intel, such as the 80X86, or Pentium processor, or a SPARC™ microprocessor from Sun Microsystems™, Inc. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links are also possible. In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to local server computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, remote server computer 126 might transmit a requested code for an application program through Internet 125, ISP 124, local network 122 and communication interface 120. In accord with the invention, one such downloaded application is the apparatus for performing user notification described herein.

The received code may be executed by processor 113 as it is received, and/or stored in mass storage 112, or other non-volatile storage for later execution. In this manner, computer 100 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Java™ Desktop Environments

Java™ desktop environments, such as the HotJava Views™ environment, provide a dedicated application environment and an easy-to-use interface that allow for controlled selection of alternative enterprise applications. The enterprise applications can be implemented over business internets and intranets using the applet mechanism supported by the Java™ runtime environment.

Figure 3:
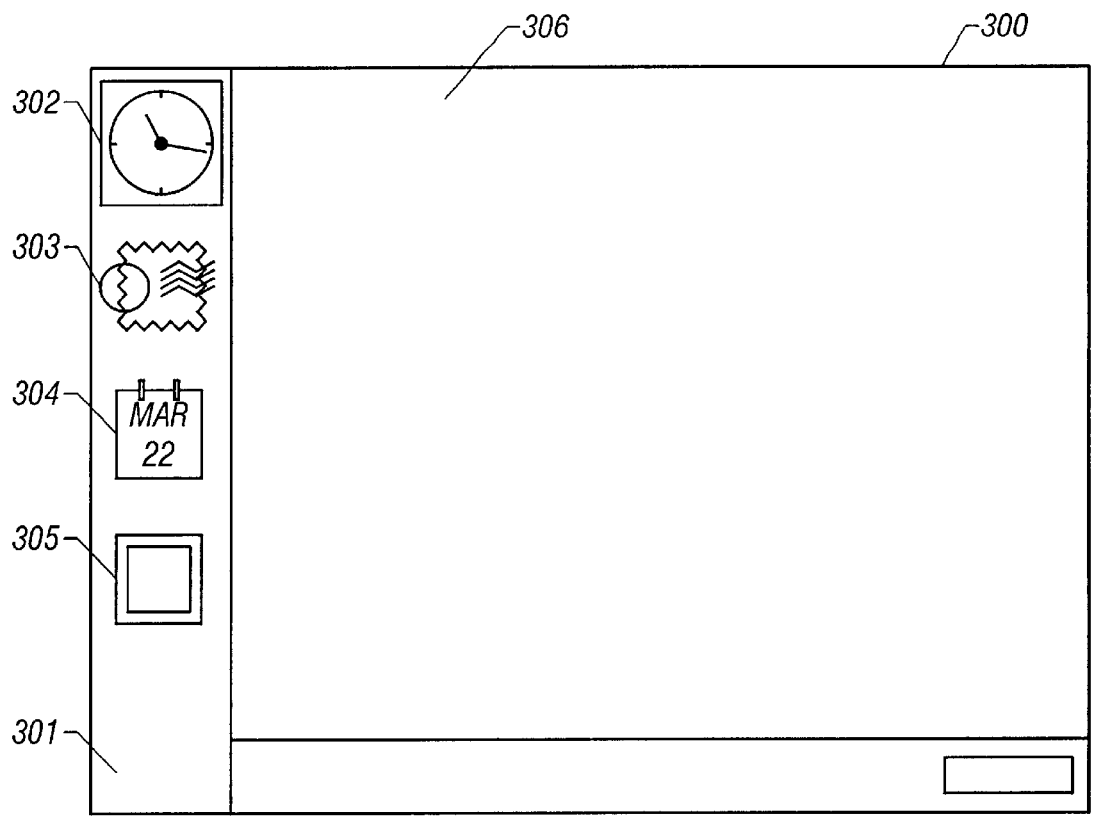
FIG. 3 is an illustration of an embodiment of an application selection window environment provided by a desktop manager in accordance with an embodiment of the invention.

In the HotJava Views™ environment, a desktop manager application supports a user desktop which contains one or more desktop windows comprising a main application window and a selection bar from which a user may select an enterprise application. FIG. 3 illustrates an embodiment of a desktop window 300, as used by the HotJava Views™ environment. Desktop window 300 contains main application window 306 for display of the selected application, or an HTML page associated with the selected application. Selection bar 301 is located on one edge of main application window 306. Selection bar 301 contains application button icons, such as icons 302, 303, 304 and 305.

Each enterprise application is represented by a button icon in selection bar 301. For example, in FIG. 3, icon 302 is a clock image associated with a desktop welcome page document. Icon 303 is a stamp image associated with an electronic mail application. Icon 304 is a calendar image associated with a calendar application. Icon 305 is a computer image associated with a browser application.

When a user wishes to use one of the enterprise applications, the user presses the associated button icon in the selection bar by, for example, pressing a mouse button while the mouse cursor is on the desired application's button icon. This action triggers a mouse event that results in the loading (if necessary) and display of the selected application in the main application window. The previously selected application may be rendered invisible (i.e., no longer displayed) by the mouse event as well.

The HotJava Views™ environment is designed to be able to run on a JavaStation™ computer running the JavaOS™ operating system, as well as any other operating system that supports the Java™ runtime environment, such as Solaris™, Windows 95, or Windows NT operating systems. Version 1.0 of the JavaOS™ operating system is designed to support a single application. The JavaOS™ operating system provides the Java™ runtime environment comprising the Java™ virtual machine, a standard package of Java™ classes, and native operating system code to support them. In the HotJava Views environment, the desktop manager application represents the single application supported directly by the JavaOS™ operating system, with enterprise applications embodied as applets that run on top of the desktop manager application.

The desktop manager application is designed around the browser concept. Each button icon in the selection bar has an associated URL identifying the location of an HTML document that contains an applet tag of the applet embodying the enterprise application. Selection of a button icon from the selection bar causes the desktop manager to load and display the HTML document in the main application window. The applet classes designated by the HTML document are loaded into the Java™ runtime environment, if they are not already resident from a previous selection, and the applet is started. Multiple applets may be executed simultaneously in the Java™ runtime environment.

An applet life cycle is primarily governed by the init( ), start( ), stop( ) and destroy( ) methods. The init( ) method is called once after the applet is first launched. The start( ) method is called after the init( ) method and whenever the applet's page is revisited. The stop( ) method is called whenever a user moves away from an applet's page by clicking another button icon in the selection bar. It is suggested that the stop( ) method include steps for saving the state of the applet. The destroy( ) method is called when the desktop manager application exits normally, or when the desktop manager application needs to terminate the applet for other reasons, such as a low memory condition.

Figure 4A:
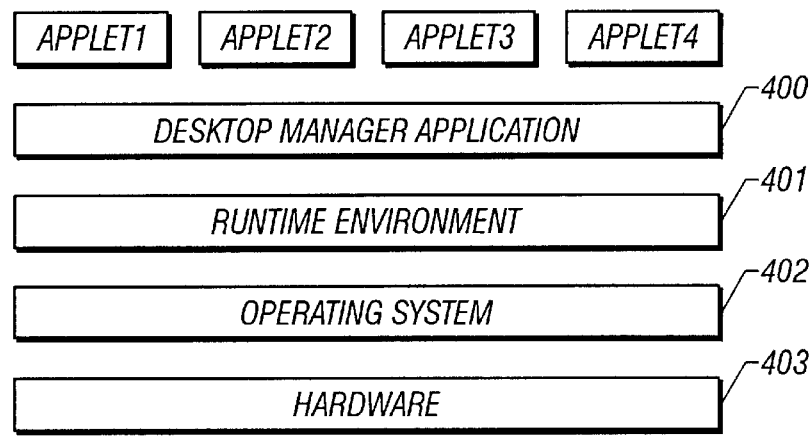
FIGS. 4A and 4B are block diagrams of a Java™ runtime environment employing a desktop manager application without user notification classes.

FIG. 4A is a block diagram of a Java™ runtime environment employing a desktop manager application to support multiple applets. In FIG. 4A, operating system 402 is executed as machine code instructions by computer hardware 403. Runtime environment 401 runs on top of operating system 402, converting bytecodes into native operating systems calls and executable machine code instructions. Under the JavaOS™ operating system, runtime environment 401 and operating system 402 are implemented together for optimized Java™ runtime execution. Desktop manager application 400 is executed within runtime environment 401, and is responsible for running one or more applets, such as applet1, applet2, applet3 and applet4. The selection bar of the desktop manager application may support an arbitrary number of applet button icons. However, due to memory constraints, particularly in network computers where hardware is minimized, the number of applets that can simultaneously execute within desktop manager application 400 and runtime environment 401 is limited.

In one embodiment, the desktop manager application performs its own memory management. The Java™ runtime environment performs garbage collection, but in order for memory to be reclaimed, the desktop manager must release the memory as needed. The desktop manager application continuously monitors the amount of available free memory, which at any given time is in one of three states: "green," "yellow" or "red." "Green" is the normal operating condition. The memory state changes to "yellow" when the system becomes low on memory, and moves to "red" when the system is running out of memory. The thresholds between the states may be set in the desktop manager application configuration files. When the desktop manager application enters the "yellow" or "red" state, the desktop manager application attempts to free up memory by disabling some processes, as well as destroying non-visible images and windows.

In the "green" state, normal garbage collection occurs, and applets and images can be loaded by the desktop manager application. In the "yellow" state, the desktop manager application performs the following steps in an attempt to return to the "green" state:

1) Image loading is disabled.
2) Cloning of document windows is disabled.
3) Non-visible images, ImageMaps and documents that do not contain applets are destroyed.
4) Non-visible HTML viewer windows are destroyed.
5) A low memory event is sent to all applets, giving each applet an opportunity to release some memory if it can.
6) All browser history is destroyed.
7) Visible HTML viewer windows are destroyed.

In the "red" state, all of the above activities for the "yellow" state have occurred. In addition, the following steps are taken to free memory:

1) Applet loading is disabled.
2) Non-visible applets are destroyed. The order of destruction can be predetermined by associating a destruction priority with each applet.
3) If the system continues to run out of memory, the applets will start to receive OutOfMemory exceptions.

Figure 4B:
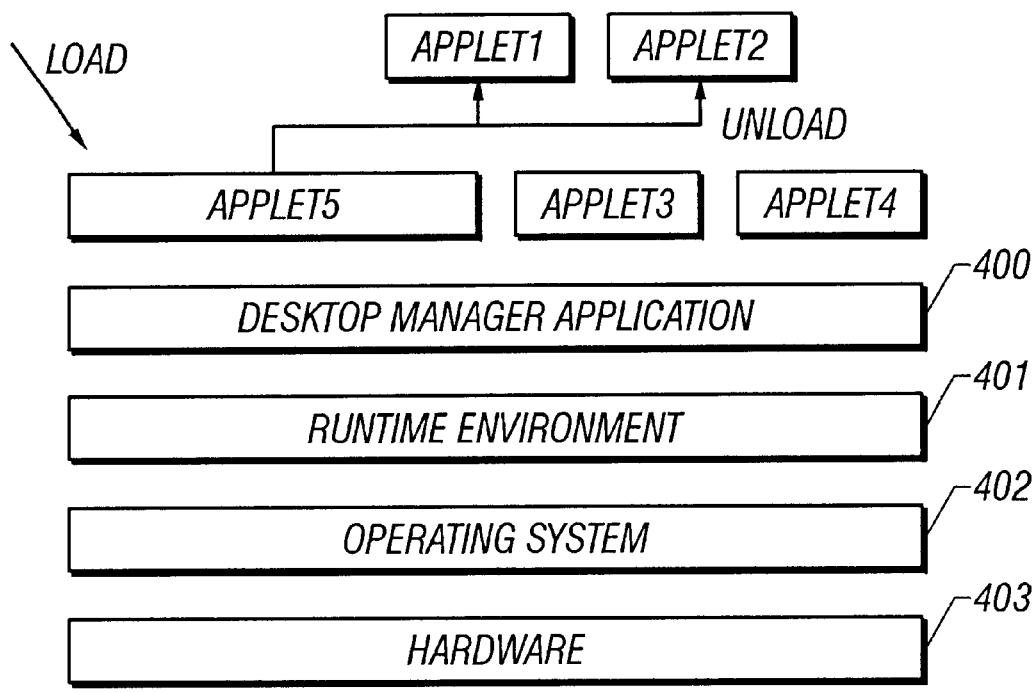

Due to the memory management activities of the desktop manager application, applets running under the desktop manager application are not guaranteed to be around for a long period of time because applets that are not visible may be unloaded ("destroyed") to make room for new applets when memory is low (and possibly reloaded in the future when needed by the user). Applet unloading is illustrated in FIG. 4B. FIG. 4B is similar to FIG. 4A, except that applet1 and applet2 have been unloaded by runtime environment 401 to provide memory for applet5. Applet5 is thus executed within runtime environment 401, whereas applet1 and applet2 no longer have any mechanism for execution.

The process of unloading applets can cause problems for applets that need to be running continuously in order to give user notification or feedback of state changes. Some of the common forms of user feedback are changing the button icon image for the application in the selection bar, playing an audio clip, or displaying a message in a dialog box. For example, the electronic mail button icon in the selection bar can change to signal that new mail has arrived, the calendar applet can display a small pop-up window with appointment information, and the clock can animate to display the time. However, no user notification or feedback activity can be carried out for an applet that is no longer resident in the runtime environment.

User Notification Classes

An embodiment of the invention provides a method and apparatus for performing user notification even when an applet has been unloaded from the Java™ runtime environment. The user notification steps are separated from each individual applet and executed within independent notification classes embodied as threads. Notification class implementations may vary between applets based upon what services or functionality a given applet requires from its associated notification class. Also, a thread embodying a notification class may perform additional functions that should occur outside of the standard life cycle of an associated applet, such as initializing a database.

The notification classes are loaded upon startup of the desktop manager application, and are executed as threads spawned or instantiated by the desktop manager application, rather than as methods or classes loaded and instantiated by an applet. The notification classes are therefore not subject to being unloaded by the memory management processes of the desktop manager application. An applet can interact with an associated notification class, if necessary, by the exchange of applet events or by directly accessing the methods of an instance of the associated notification class. However, an applet must first obtain a reference to the associated notification class instance from the desktop manager. In this embodiment, security is maintained by only permitting an applet to obtain a reference to an instance of its own associated notification class.

Figure 5:
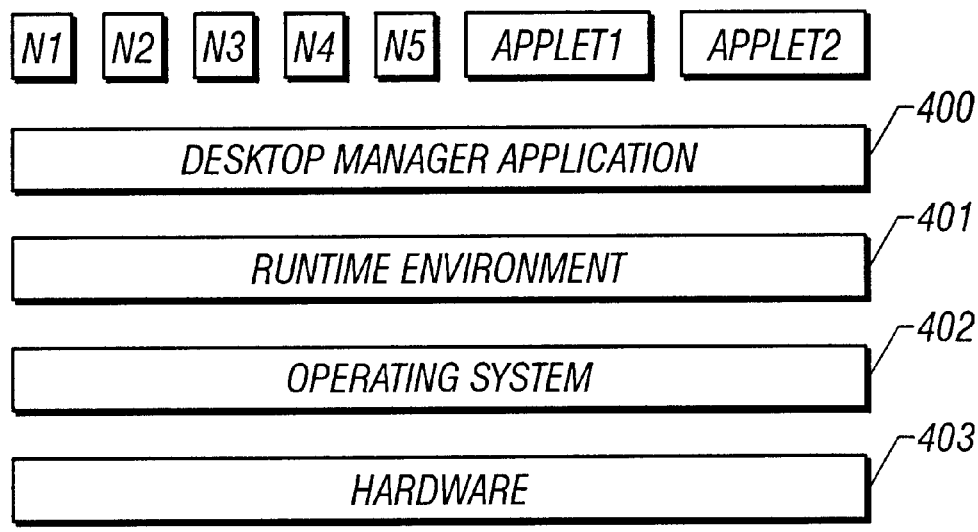
FIG. 5 is a block diagram of a Java™ runtime environment employing a desktop manager application and user notification classes in accordance with an embodiment of the invention.

FIG. 5 is a block diagram of a Java™ runtime environment employing a desktop manager application similar to FIGS. 4A and 4B, with the addition of multiple notification classes. FIG. 5 assumes that five different applets (applet1, applet2, applet3, applet4 and applet5) are selectable from the selection bar of the desktop manager application. In accordance with an embodiment of the invention, a notification class is provided for each applet, with notification classes N1, N2, N3, N4 and N5 associated with applet1, applet2, applet3, applet4 and applet5, respectively. Regardless of loading and unloading of the five applets, notification classes N1–N5 maintain all user notification functions. For example, as shown in FIG. 5, applet1 and applet2 are being executed in runtime environment 401, and applet 3, applet4 and applet5 are not loaded. However, because user notification and feedback activities are performed by instances of the notification classes N1–N5 which remain as active threads in the desktop manager application, user notification and feedback can still occur on behalf of applet3, applet4 and applet5.

The desktop manager application accesses one or more configuration files on startup. The configuration files list the button icons to be displayed in the selection bar and provide information associated with each button icon. Identification of the button icons, or buttons, to be included in the selection bar may be provided as a property in a configuration file, for example, in the form of a delimited list:

selector.swbuttons=welcome|mail|calendar|name|(etc.)

where "welcome," "mail," "calendar" and "name" identify the button icons and their display order. The information associated with each button icon may also be represented as properties in configuration file 604. The information may include, for example:

1) The location or URL of the HTML document (and any applet identified therein) to be loaded when the button icon is selected.
2) The type of display mode to be used when displaying the HTML document. Example modes are:
    PAGE: Displays the page with no navigation controls. Typically used when an applet will occupy the entire display area.
    SIMPLE: Display the page with constrained navigation controls. E.g., the user cannot type in a URL directly.
    NORMAL: Display the page with simple navigation controls. Allows the user to enter a URL.
    FULLBROWSER: Display the page with full navigation controls, plus some menus for more advanced features.

EXIT: Causes the desktop manager to exit when the button icon is pressed.

3) Default button icon images, such as a normal (unselected and inactive) image, a clicked image (for when a mouse button is pressed over the button icon), and an active image for when the applet associated with the button icon is executing.

4) The notification class that is to be loaded when the desktop manager application starts.

5) The memory priority to control which applets are discarded first when memory is low (e.g., 0–5 with priority 0 being unloaded first).

An example property list for a calendar button icon associated with the calendar applet might appear as follows:

selector.sw.calendar.location=<base>/html/calendar/calendar.html
selector.sw.calendar.type=PAGE
selector.sw.calendar.normalImage=<base>/images/icons/calNormal.gif
selector.sw.calendar.normalImage=<base>/images/icons/calClicked.gif
selector.sw.calendar.activeImage=<base>/images/icons/calActive.gif
selector.sw.calendar.notifierCodeBase=<base>/html/classes selector.sw.calendar.notifierCode=SwCal.class
selector.sw.calendar.priority=0 where <base> is a keyword that expands to the installed location of the desktop manager application, typically a URL such as http://webserver/jdt. If the notification code is implemented in more than one class, the notification classes may be identified using a notifierArchive property to specify an archive file containing the classes.

Figure 6A:
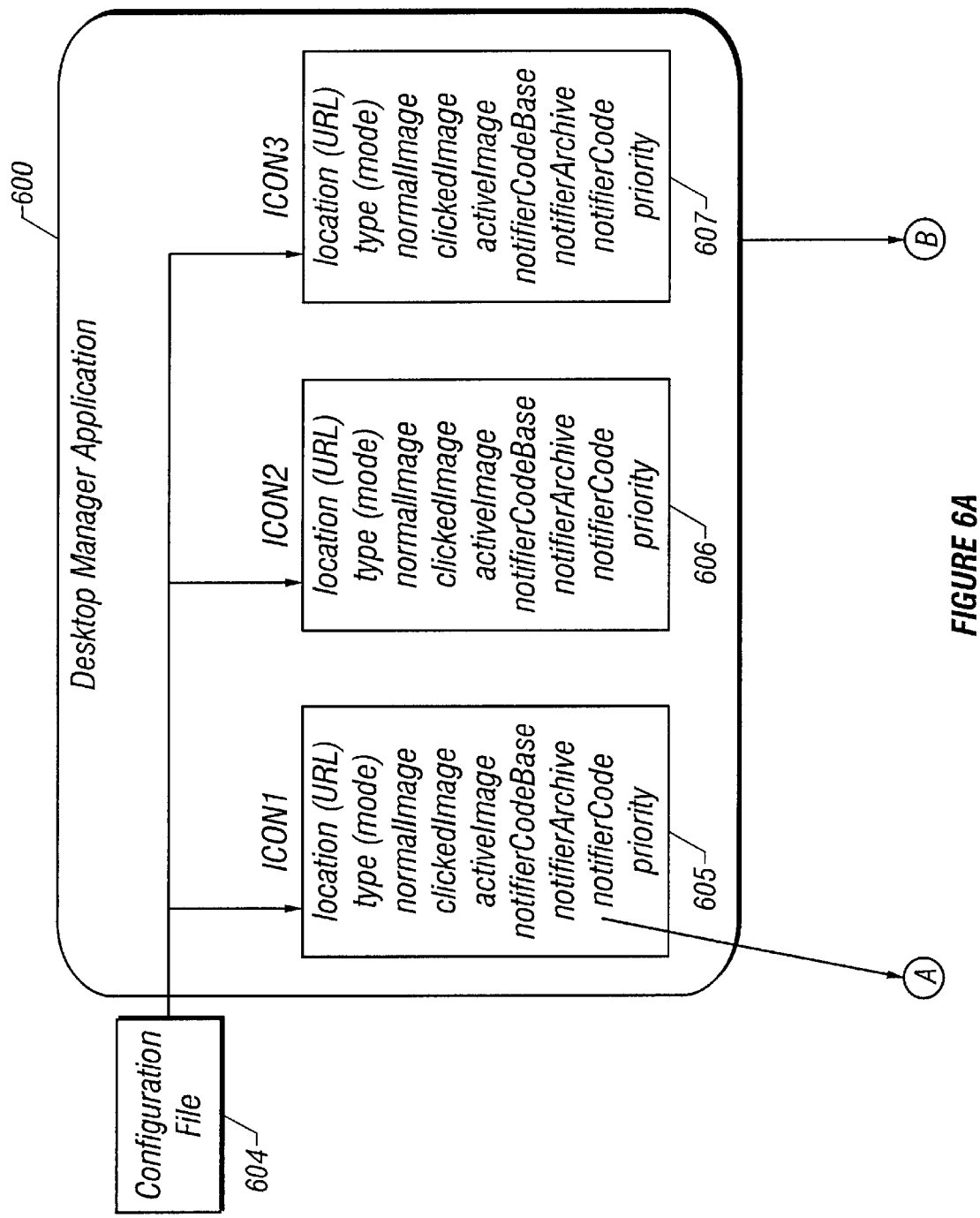
FIG. 6 is a block diagram illustrating the interaction of a user notification class, a desktop manager class and an applet class in accordance with an embodiment of the invention.
Figure 6B:
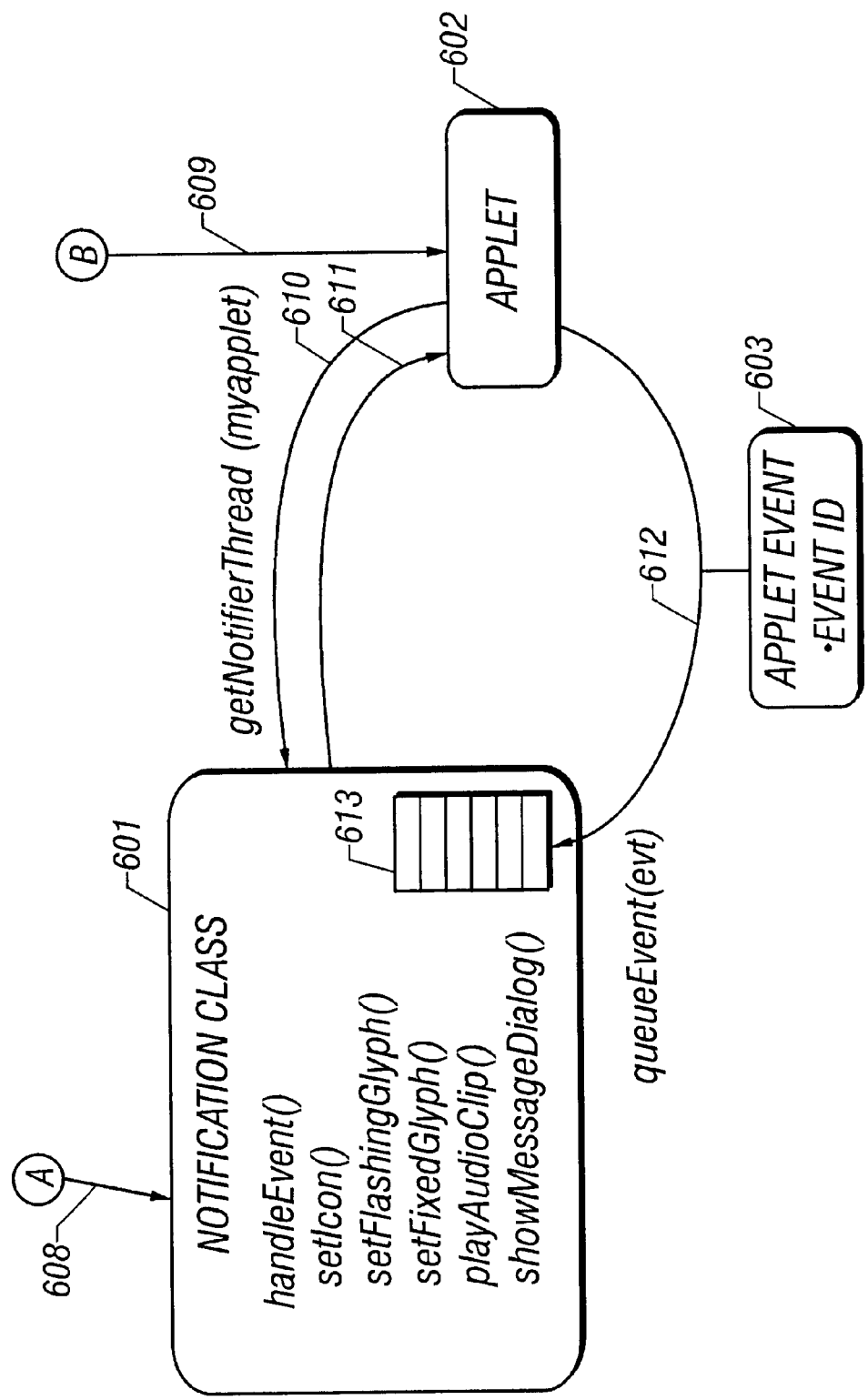

FIG. 6 is a block diagram illustrating the interaction between a desktop manager application 600, an applet 602 and an instance of a notification class 601 in accordance with an embodiment of the invention. Though each button icon may have an associated notification class (or classes) and an associated applet, for the purpose of clarity, only the notification class and applet associated with icon1 are shown in FIG. 6.

On startup, desktop manager application 600 accesses configuration file 604, and obtains a list of button icons (icon1, icon2 and icon3) for display in a selection bar, as well as information associated with each button icon, such as button icon information 605 associated with icon1, button icon information 606 associated with icon2, and button icon information 607 associated with icon3. Based on button icon information 605, desktop manager application 600 causes the class loader of the underlying Java™ runtime environment to load (as represented by arrow 608) notification class 601 for execution as a thread. Notification class 601 is provided with event queue 613 for the receipt and handling of events.

As represented by arrow 609, when icon1 is selected on the selection bar, the HTML document identified by the URL in button icon information 605 is loaded, and applet 602, identified in an applet tag within the HTML document, is loaded and launched. Applet 602 and notification class 601 operate independently, in that, if applet 602 is subsequently destroyed (e.g., its destroy( ) method is called and it is unloaded from the runtime environment), notification class 601 remains in memory and continues to execute in the runtime environment as an independent thread.

If applet 602 and notification class 601 need to interface to provide feedback to a user about a change of state, applet 602 communicates by sending applet events to notification class 601. Notification class 601 implements one or more methods for handling the applet events thus obtained. First, however, applet 602 obtains a reference to the instance of notification class 601 to determine where to direct the applet events. A reference is obtained, via desktop manager application 600, by calling the getNotifierThread( ) method (represented by arrow 610) of the notification class, and identifying the calling applet as a method argument. As represented by return arrow 611, the notification class returns an object reference to the notification class instance serving the given applet, in this case, a reference to notification class 601.

Once a reference has been obtained, applet 602 is able to generate applet events, such as applet event 603, and place those events on event queue 613 of notification class 601, or applet 602 may access the methods in notification class 601 directly. As represented by arrow 612, an applet event is placed on event queue 613 by calling the queueEvent( ) method of the referenced notification class.

Each applet event is an instance of an applet event class, and contains an event ID. The event ID is used by an event handler (handleEvent( ) method) to classify the type of event for use in determining an appropriate response to the event. In accordance with an embodiment of the invention, the response to an applet event entails one or more forms of user notification, such as changing the button icon in the selection bar, setting a fixed or flashing glyph on the button icon, displaying a message in a dialog box, or playing an audio clip. For example, assuming that notification class 601 is associated with an electronic mail applet, a possible response to an applet event indicating receipt of new mail is to call a setIcon( ) method to change the image of the button icon in the selection bar to indicate that new mail has arrived. Other notification methods illustrated in the embodiment of FIG. 6 that may be called by the event handler of notification class 601 in response to specific events include setFlashingGlyph( ), setFixedGlyph( ), playAudioClip( ) and showMessageDialog( ). These notification methods are implemented within the notification class or in a parent class of the notification class.

Figure 7:
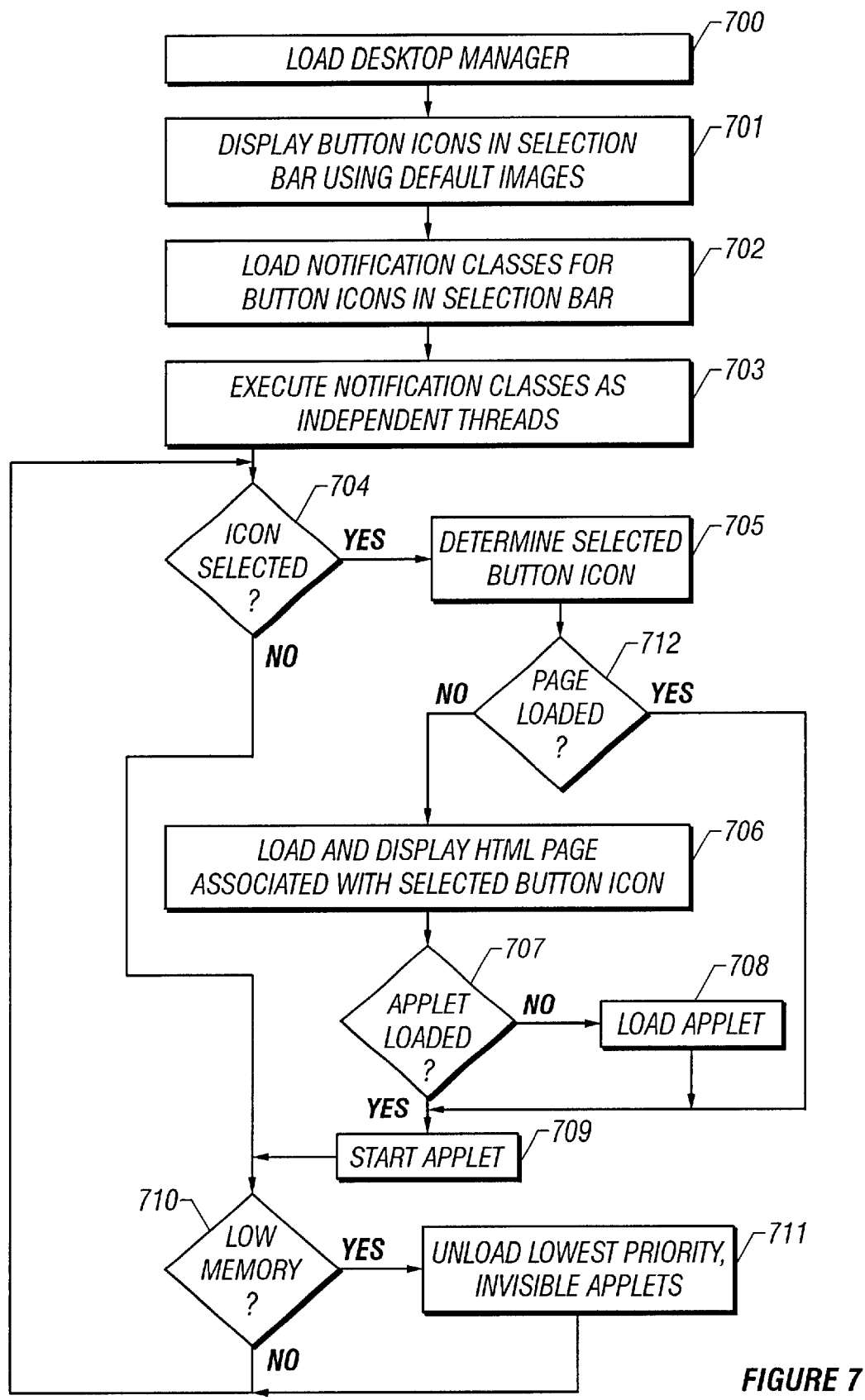
FIG. 7 is a flow diagram of a desktop manager application in accordance with an embodiment of the invention.

FIG. 7 is a flow diagram of the actions of the desktop manager application relative to the notification classes and applets it supports. Memory management steps, aside from the unloading of applets under low memory conditions, are not shown for the purpose of clarity. The process flow begins at step 700 when the desktop manager is loaded. As stated previously, configuration files are accessed during startup of the desktop manager application. In step 701, using the default button icon images specified in the configuration files, the desktop manager displays the button icons in a selection bar. In step 702, the desktop manager application loads the notification classes specified in the configuration files. In step 703, execution of the notification classes as independent threads is initiated.

During operation of the desktop manager application, if a button icon in the selection bar is selected, as indicated, for example, by a mouse event, execution branches at step 704 to step 705. Otherwise, the process flow continues to step 710. In step 705, the desktop manager application determines which button icon was selected by the mouse event. After step 705, a branch occurs in step 712 based on whether the HTML page associated with the selected button icon is already loaded. If the HTML page is already loaded, the process continues at step 709. If the HTML page is not already loaded, then, in step 706, the URL specified in the configuration files for the selected button icon is used to load and display the HTML page. Assuming the HTML page contains an applet, at step 707, a branching occurs based on whether the applet was previously loaded. If the applet was not previously loaded, in step 708, the class loader loads the applet into the Java™ runtime environment before continuing to step 709, where the applet is started. Step 709 leads to step 710.

Step 710 represents a branch in execution for a low memory condition. If the desktop manager application becomes aware of a low memory condition, such as described previously for the "red" memory state, in step 711, the desktop manager may call the destroy( ) method of the lowest priority applets that are not currently visible on a display. The applets thus destroyed are effectively unloaded from the Java™ runtime environment, in that the memory associated with the applets is released or de-allocated. After handling the low memory condition in step 711, or if no low memory condition existed at step 710, process flow returns to step 704.

Figure 8A:
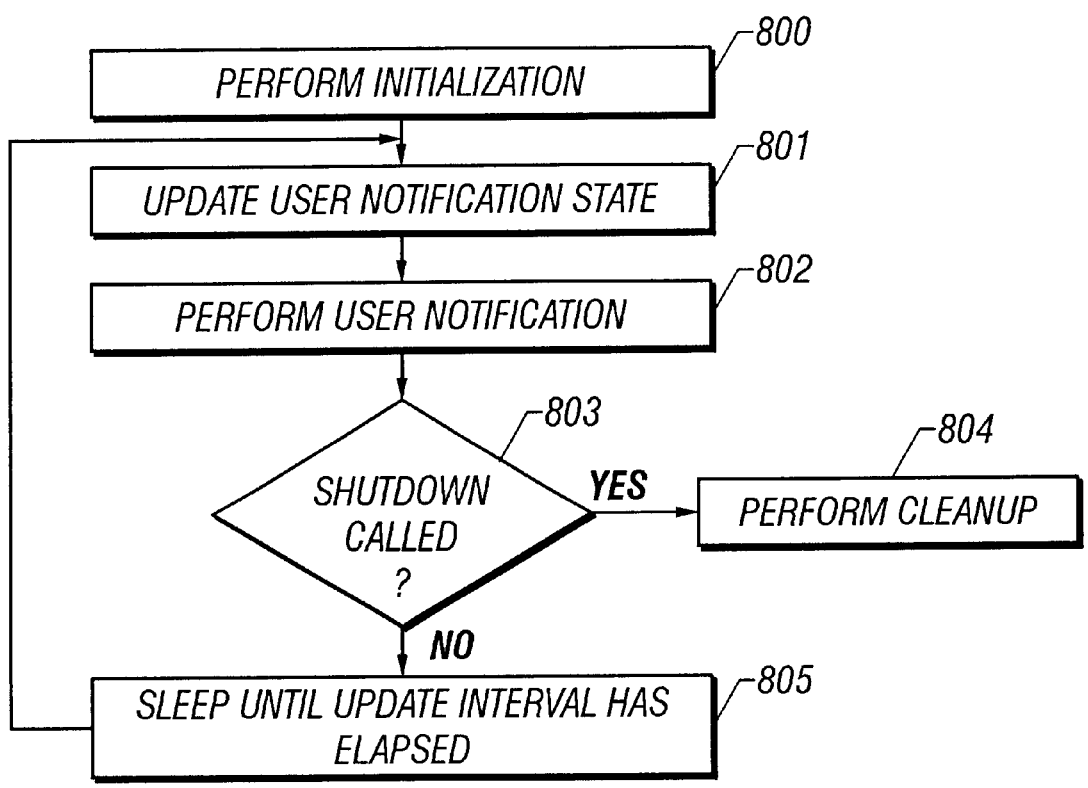
FIG. 8A is a flow diagram of a user notification class, which does not interact with an applet, in accordance with an embodiment of the invention.
Figure 8B:
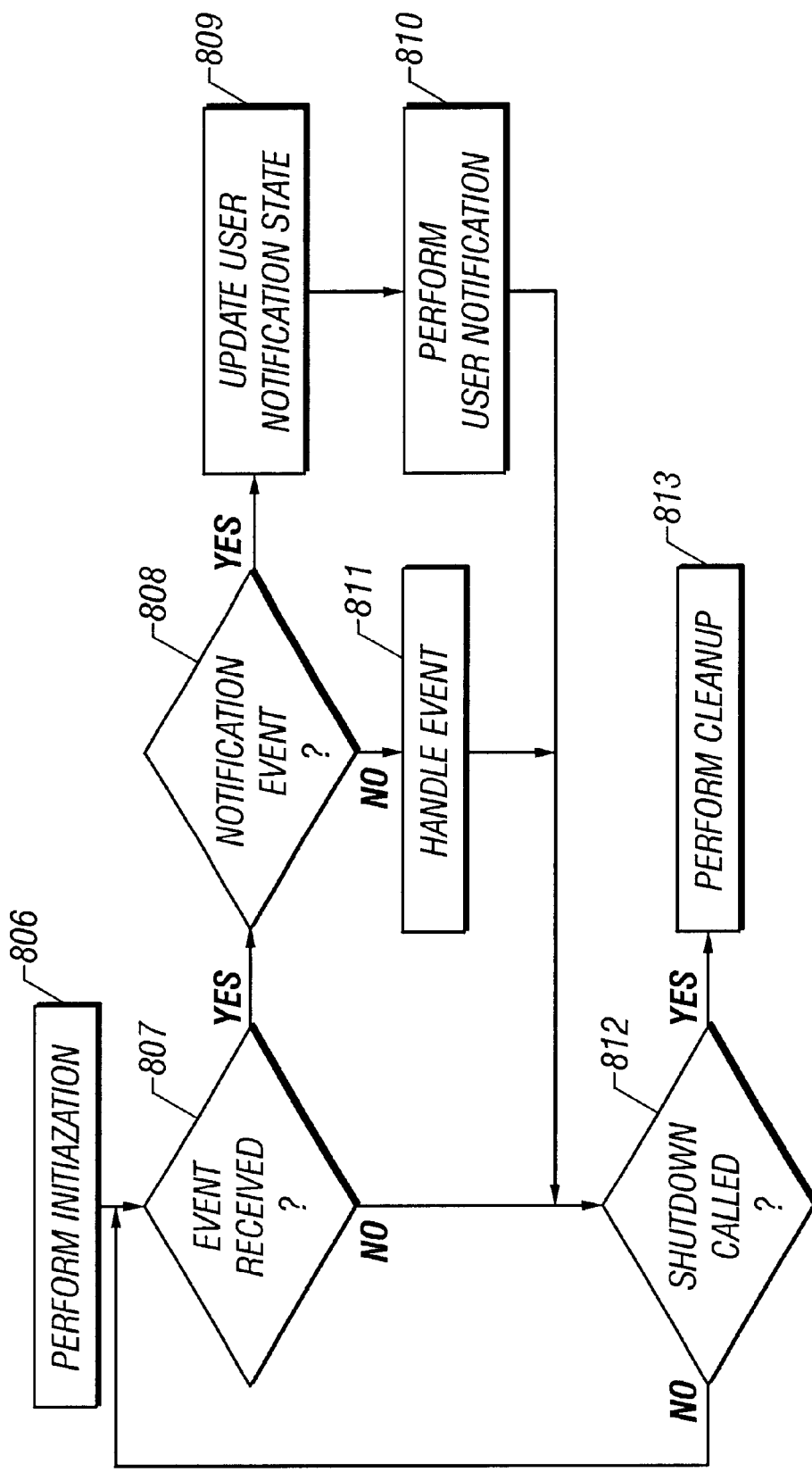
FIG. 8B is a flow diagram of a user notification class which interacts with an applet in accordance with an embodiment of the invention.

FIGS. 8A and 8B are flow diagrams for a notification class in accordance with embodiments of the invention. FIG. 8A illustrates the process flow for a notification class that does not require interaction with an applet. An example of a situation in which the notification class does not need to interact with an applet is the clock icon of a welcome screen. The clock icon is animated to show the correct time, but no other user notification is required of the welcome screen. Thus, the clock icon animation may be handled within the notification class in a general run( ) method. FIG. 8B illustrates the process flow for a notification class that interacts with an applet via applet events. An example of a situation in which a notification class interacts with an applet is the electronic mail example, wherein the applet sends events to the notification class to indicate the arrival of new mail.

In FIG. 8A, at step 800, the notification class performs any needed initialization steps. In step 801, any state maintained for the purposes of user notification, such as the current time or time-dependent data, is updated. Step 801 may include, for example, determining an appropriate clock image based on the current time. In step 802, user notification is performed, such as calling a seticon( ) method to display the updated clock images on the associated button icon. Other examples of notification methods that could be invoked are setFixGlyph( ) to set a glyph on the button icon, showMessageDialog( ) to display a message in a dialog box, and playAudioClip( ) to play an audio file, such as an alert sound, over an audio output device. Further, in step 802, the notification class can also perform other tasks that might occur outside of the life cycle of an associated applet, such as initializing a database.

If a shutdown method is invoked at step 803, such as during shutdown of the desktop manager application, then, in step 804, the class performs any necessary cleanup activities before the thread exits. If the shutdown method is not invoked at step 803, the thread embodying the notification class sleeps in step 805 for a specified interval before returning to step 801. Steps 801, 802 and 805 may be implemented inside of a run( ) method of the notification class.

In FIG. 8B, at step 806, the notification class performs any needed initialization steps. At step 807, a branch occurs if an event is received on the event queue of the notification class. If no event is received, the process flow continues at step 812. If an event is received, then a further branch occurs in step 808 based on whether the event is a notification event. The type of event may be determined from the event ID. If the event is not a notification event, the event is handled in step 811, and the process flow continues at step 812. If the event in step 808 is a notification event, the state of the notification class is updated, if needed, in step 809 based on the specific event. In step 810, user notification is performed, for example, by calling one of the methods: setIcon( ), setFixGlyph( ), showMessageDialog( ) and playAudioClip( ). After step 810, process flow continues at step 812.

If a shutdown method is invoked at step 812, then, in step 813, the class performs any necessary cleanup activities before the thread exits. If the shutdown method is not invoked at step 812, the process flow returns to step 807. Steps 807–811 may be implemented inside of a handleEvent( ) method of the notification class.

Figure 9:
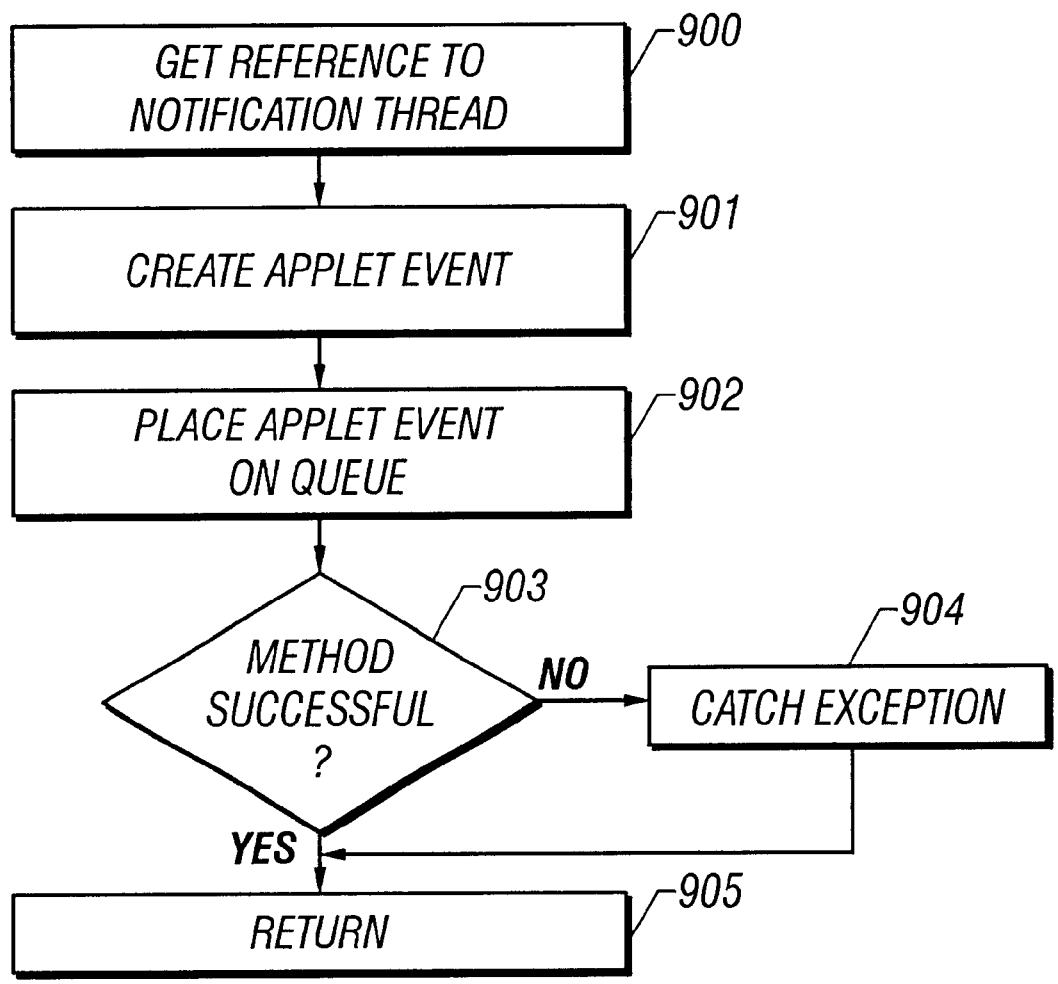
FIG. 9 is a flow diagram of an applet, which interacts with a user notification class, in accordance with an embodiment of the invention.

FIG. 9 is a simplified flow diagram of a method for an applet to communicate with a notification class in accordance with an embodiment of the invention. The method of FIG. 9 is constructed in the form of a try/catch function to catch an exception if the function fails. To begin communication, in step 900, the applet calls the getNotifierThread( ) method of the notification class to get a reference to the notification class instance designated for that applet. In step 901, the applet creates an applet event with an event ID indicating the type of event. In step 902, the applet invokes the queueevent( ) method of the referenced notification class instance to place the event on the event queue of the notification class instance. In step 903, a branch occurs based on whether steps 900–902 were successful. If steps 900–902 were successful, the method returns in step 905. If steps 900–902 were not successfully completed, an exception is caught in step 904 before the communication method returns in step 905.

An application programming interface (API) definition for a parent notification class "SWNotifier" is provided as Appendix A located on compact disk filed. In accordance with an embodiment of the invention, specific embodiments of notification classes may be defined by extending the SWNotifier class. Appendices B and C located on compact disk filed provide API's for an applet event class and a thread class, respectively. Further Java™ API's may be obtained from the world wide web (WWW) site of Sun Microsystems™, Inc. located at http://www.sun.com.

Thus, a method and apparatus for performing user notification has been described in conjunction with one or more specific embodiments. The invention is defined by the claims and their full scope of equivalents.

What is claimed is:

1. An apparatus comprising:
   a manager mechanism configured to load and unload sub-components transient memory;
   a sub-component, said manager mechanism unloading said sub-component in response to a low memory condition of said transient memory;
   a service class associated with said sub-component, wherein said service class is separated from said sub-component, said service class configured to perform a user notification function of said sub-component, said service class being instantiated by said manager mechanism and executing as a thread independent of said sub-component such that said user notification function of said service class is maintained when said sub-component is unloaded in response to a low memory condition.

2. The apparatus of claim 1, wherein said user notification function comprises at least one of:
   displaying a message;
   playing an audio file; and changing an image icon.

3. The apparatus of claim 1, wherein said sub-component comprises an applet.

4. The apparatus of claim 1, wherein said manager mechanism is configured as a browser.

5. The apparatus of claim 1, wherein said manager mechanism is executed in a Java™ runtime environment.

6. A method for performing user notification comprising:
extracting one or more service classes from each of one or more sub-components loaded in transient memory, wherein each of said one or more service classes comprises at least one user notification function associated with said each of said one or more sub-components;
a manager mechanism instantiating said one or more service classes;
unloading said one or more sub-components in response to a low memory condition of said transient memory;
executing each of said one or more service classes as a thread independent of said one or more sub-components; and
performing, in said one or more service classes, said at least one user notification function associated with said each of one or more sub-components such that said at least one user notification function is maintained when said each of said one or more sub-components is unloaded in response to a low memory condition of said transient memory.

7. The method of claim 6, wherein said performing said at least one user notification function comprises at least one of:
displaying a message;
playing an audio file; and
changing an image icon.

8. The method of claim 6, further comprising:
said each of said one or more sub-components obtaining a reference to said one or more service classes;
said each of said one or more sub-components using said reference to interact with said one or more service classes; and
securing said reference against access by a sub-component that is not said each of said one or more sub-components.

9. The method of claim 6, further comprising configuring said each of said one or more sub-components as an applet.

10. The method of claim 9, further comprising configuring said manager mechanism as a browser.

11. The method of claim 10, further comprising executing said manager mechanism in a Java™ runtime environment.

12. A computer program product comprising:
a computer usable medium having computer readable code embodied therein for performing user notification, said computer program product comprising:
computer readable code configured to cause a computer to extract one or more service classes from each of one or more sub-components loaded in transient memory, wherein each of said one or more service classes comprises at least one user notification function associated with said each of said one or more sub-components;
computer readable code configured to cause a manager mechanism to instantiate said one or more service classes;
computer readable code configured to cause a computer to unload said one or more sub-component under a low memory condition of said transient memory;
computer readable code configured to cause a computer to execute each of said one or more service classes as a thread independent of said one or more sub-components; and
computer readable code configured to cause a computer to perform, in said one or more service classes, said at least one user notification function associated with said each of said one or more sub-components such that said at least one user notification function is maintained when said each of said one or more sub-components is unloaded in response to a low memory condition of said transient memory.

13. The computer program product of claim 12, wherein said at least one user notification function comprises at least one of:
displaying a message;
playing an audio file; and
changing an image icon.

14. The computer program product of claim 12, further comprising:
computer readable code configured to cause said each of said one or more sub-components to obtain a reference to said one or more s service classes;
computer readable code configured to cause said each of said one or more sub-components to use said reference to interact with said one or more service classes; and
computer readable code configured to cause said computer to secure said reference against access by a sub-component that is not said each of said one or more sub-components.

15. The computer program product of claim 12, wherein said sub-component is configured as an applet.

16. The computer program product of claim 15, wherein said manager mechanism is configured as a browser.

17. The computer program product of claim 16, further comprising computer readable code configured to cause a computer to execute said manager mechanism within a Java™ runtime environment.

18. A memory configured to store data for access by a runtime environment executing in a computer system, comprising:
a data structure stored in transient memory, said data structure comprising:
an applet;
a service class extracted from said applet, said service class comprising an event queue and a plurality of methods, wherein said applet is configured to invoke one or more of said plurality of methods of said service class, wherein said applet is further configured to place an event on said event queue, said plurality of methods comprising:
a reference method configured to return a reference to an instance of said service class;
a service method configured to perform a service;
an event method configured to handle one or more events;
a manager application associating said applet with said service class, said manager application configured to instantiate said service class as a thread to be run independently of said applet, said manager application configured to unload said applet in response to a low memory condition of said transient memory, wherein said service is maintained when said applet is unloaded in response to said low memory condition.

19. The memory of claim 18, wherein said service comprises performing a user notification function.

20. The memory of claim 19, wherein said user notification function comprised one or more of:
  displaying a message;
  playing an audio file; and
  changing an image icon.

21. An apparatus comprising:
  a manager mechanism configured to load and unload sub-components from transient memory;
  a sub-component, said manager mechanism unloading said sub-component in response to a low memory condition of said transient memory;
  a service class associated with said sub-component, wherein said service class is separated from said sub-component and instantiated by said manager mechanism at startup, said service class configured to perform a user notification function of said sub-component, said service class executing as a thread independent of said sub-component to maintain said user notification function of said sub-component when said sub-component is unloaded by said manager mechanism as a result of a low memory condition of said transient memory.

* * * * *